United States Patent
Herman et al.

(10) Patent No.: US 11,524,647 B2
(45) Date of Patent: Dec. 13, 2022

(54) RECALIBRATION OF RADAR SENSOR AFTER AIRBAG DEPLOYMENT

(71) Applicant: Ford Global Technologies, LLC, Dearborn, MI (US)

(72) Inventors: David Michael Herman, Oak Park, MI (US); Brian Quinn Kettlewell, Cambridge (CA)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 17/110,444

(22) Filed: Dec. 3, 2020

(65) Prior Publication Data
US 2022/0176902 A1   Jun. 9, 2022

(51) Int. Cl.
| | | |
|---|---|---|
| *B60R 21/0134* | (2006.01) | |
| *B60W 50/14* | (2020.01) | |
| *G01S 7/40* | (2006.01) | |

(52) U.S. Cl.
CPC ......... *B60R 21/0134* (2013.01); *B60W 50/14* (2013.01); *G01S 7/4004* (2013.01); *B60W 2050/146* (2013.01); *G01S 7/4039* (2021.05)

(58) Field of Classification Search
CPC .............. B60R 21/0134; B60W 50/14; B60W 2050/146; B60W 2420/52; G01S 7/4004; G01S 7/4039; G01S 17/89; G01S 17/931

USPC .......................................................... 701/45
See application file for complete search history.

(56) References Cited

U.S. PATENT DOCUMENTS

| | | | |
|---|---|---|---|
| 7,143,856 B2 | 12/2006 | Takahashi et al. | |
| 2019/0143964 A1* | 5/2019 | Zuckerman | B60W 60/001 |
| | | | 701/23 |
| 2019/0204412 A1 | 7/2019 | Jiang | |
| 2019/0366971 A1* | 12/2019 | Nakamura | B60R 21/36 |
| 2021/0245701 A1* | 8/2021 | Haltom | B60R 21/0134 |
| 2022/0099826 A1* | 3/2022 | Vervoort | G01S 15/931 |
| 2022/0172487 A1* | 6/2022 | Ewert | G01S 15/931 |

FOREIGN PATENT DOCUMENTS

KR    20150106200 A    9/2015

* cited by examiner

*Primary Examiner* — Abby Y Lin
*Assistant Examiner* — Hossam M Abd el Latif
(74) *Attorney, Agent, or Firm* — Frank A. MacKenzie; Bejin Bieneman PLC

(57) ABSTRACT

A computer comprises a processor and a memory. The memory stores instructions executable by the processor to, upon detecting an airbag deployment in a vehicle, determine an airbag inflation state based on vehicle sensor data, to adjust a calibration parameter of a vehicle radar sensor based on the determined airbag inflation state, to operate the vehicle radar sensor based on the adjusted calibration parameter, and to update an output characteristic of the radar sensor for operating the vehicle based on the determined airbag inflation state.

20 Claims, 3 Drawing Sheets

US 11,524,647 B2

RECALIBRATION OF RADAR SENSOR AFTER AIRBAG DEPLOYMENT

BACKGROUND

A vehicle may include an exterior airbag deploying toward an exterior of the vehicle, e.g., out of a front bumper, to reduce impact between the vehicle and an object during a collision. An exterior airbag, during and after deployment, may impair operation of a vehicle radar sensor.

DETAILED DESCRIPTION

Introduction

Figure 1:
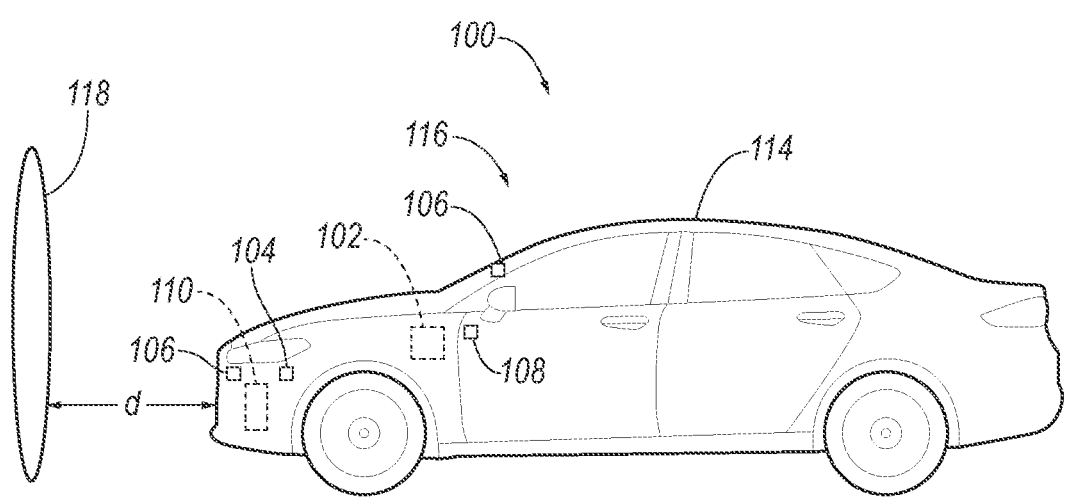
FIG. 1 shows an example vehicle with an external airbag in an uninflated state.

Disclosed herein is a computer, comprising a processor and a memory. The memory stores instructions executable by the processor, upon detecting an airbag deployment in a vehicle, to determine an airbag inflation state based on vehicle sensor data, to adjust a calibration parameter of a vehicle radar sensor based on the determined airbag inflation state, to operate the vehicle radar sensor based on the adjusted calibration parameter, and to update an output characteristic of the radar sensor for operating the vehicle based on the determined airbag inflation state.

The instructions may further include instructions to determine the airbag inflation state based on at least one of a shape of the airbag, an amount of inflation of the airbag.

The instructions may further include instructions to determine the amount of inflation of the airbag based on the vehicle sensor data including at least one of an amount of gas pumped to the airbag, a pressure of gas inside the airbag.

The instructions may further include instructions to determine the amount of gas pumped to the airbag based on data received from a gas flow sensor measuring a rate of gas flowing into or out of the airbag.

The instructions may further include instructions to determine the shape of the airbag in the inflation state based on (i) object detection data received from a second object-detection sensor including an ultrasound sensor, a lidar, or a camera sensor, (ii) a wind speed, (iii) a vehicle speed, and to determine the airbag inflation state based on the determined shape of the airbag.

The instructions may further include instructions to determine the adjusted calibration parameter such that a blockage of a field of view of the radar sensor by the airbag is at least in part compensated for a presence of the airbag.

The instructions may further include instructions to adjust the calibration parameter by selecting one calibration value from a set of stored calibration values based on the determined airbag inflation state.

The instructions may further include instructions to determine the set of stored calibration values by determining a base reflection of the vehicle radar sensor for the airbag inflation state.

The instructions may further include instructions to adjust the calibration parameter by interpolating the set of stored values based on the determined airbag inflation state and inflation state of each respective stored value upon determining that the stored values lack a stored value corresponding to the determined airbag inflation state.

The updated output characteristic may specify a change in at least one of a radar sensor detection range, a misdetection rate of the vehicle radar sensor, or an object distance detection error of the vehicle radar sensor.

The instructions may further include instructions to cause the airbag deployment based on the vehicle sensor data including at least one of a time-to-collision with an obstacle and a pressure applied to a vehicle body.

The airbag may be adjacent a vehicle front bumper, a front windshield, or a side of the vehicle.

The airbag inflation state may be one of an uninflated position, deflated position, a partially inflated position, and a fully inflated position.

The instructions may further include instructions to operate the vehicle based on data received from the vehicle radar sensor and the updated output characteristic of the radar sensor.

Further disclosed herein is a method, comprising, upon detecting an airbag deployment in a vehicle, determining an airbag inflation state based on vehicle sensor data, adjusting a calibration parameter of a vehicle radar sensor based on the determined airbag inflation state, operating the vehicle radar sensor based on the adjusted calibration parameter, and updating an output characteristic of the radar sensor for operating the vehicle based on the determined airbag inflation state.

The method may further include determining the airbag inflation state based on at least one of a shape of the airbag, an amount of inflation of the airbag.

The method may further include determining the amount of inflation of the airbag based on the vehicle sensor data including at least one of an amount of gas pumped to the airbag, a pressure of gas inside the airbag.

The method may further include determining the shape of the airbag in the inflation state based on (i) object detection data received from a second object-detection sensor including an ultrasound sensor, a lidar, or a camera sensor, (ii) a wind speed, (iii) a vehicle speed; and determining the airbag inflation state based on the determined shape of the airbag.

The method may further include determining the adjusted calibration parameter such that a blockage of a field of view of the radar sensor by the airbag is at least in part compensated for a presence of the airbag.

The method may further include adjusting the calibration parameter by selecting one calibration value from a set of stored calibration values based on the determined airbag inflation state.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

Exemplary System Elements

With reference to FIG. 1, deployment of a vehicle 100 exterior airbag 110 may (i) reduce a detection range of a vehicle 100 radar sensor 106, (ii) cause reflections of radar waves, (iii) result in deflection of radar waves, (iv) increase noise in radar data, and/or (v) cause an error in determining distance, angle, and/or relative speed of object(s) detected by the radar sensor 106. These effects may impair accuracy and/or reliability of radar data, and could thus impair a vehicle 100 operation that is based on radar sensor 106 data such as propulsion, steering, and braking.

As disclosed herein, a vehicle 100 computer 102 can be programmed, upon detecting an airbag 110 deployment in a vehicle 100, to determine an airbag 110 inflation state based on vehicle 100 sensor 106 data, and to adjust a calibration parameter of a vehicle 100 radar sensor 106 based on the determined airbag 110 inflation state. The computer 102 can be programmed to operate the vehicle 100 radar sensor 106 based on the adjusted calibration parameter and to update output characteristics of the radar sensor 106 for operating the vehicle 100 based on the determined airbag 110 inflation state.

A deployment of an external airbag 110 is typically initiated about 1.5 second (s) prior to a predicted impact. Thus, adjusting the calibration parameter of the radar sensor 106 and updating the output characteristics of the radar sensor 106 can be advantageous for operating the vehicle 100 after the external airbag 110 is deployed, e.g., the time until impact and/or after impact.

FIG. 1 shows a vehicle 100, including a computer 102, actuator(s), sensor(s), a human-machine interface (HMI 108), and one or more external airbags 110. The vehicle 100 may be any suitable type of vehicle, e.g., a passenger or commercial automobile such as a sedan, a coupe, a truck, a sport utility, a crossover, a van, a minivan, a taxi, a bus, etc. The vehicle 100, for example, may be autonomous or semi-autonomous. In other words, the vehicle 100 may be autonomously or semi-autonomously operated such that the vehicle 100 may be driven without constant attention from a driver, i.e., the vehicle 100 may be self-driving without human input.

The vehicle 100 computer 102 includes a processor and a memory such as are known. The memory includes one or more forms of computer 102 readable media, and stores instructions executable by the vehicle 100 computer 102 for performing various operations, including as disclosed herein. The computer 102 may include programming to operate one or more of vehicle 100 brakes, propulsion (e.g., control of acceleration in the vehicle 100 by controlling one or more of an internal combustion engine, electric motor, hybrid engine, etc.), steering, climate control, interior and/or exterior lights, etc., as well as to determine whether and when the computer 102, as opposed to a human operator, is to control such operations. Additionally, the computer 102 may be programmed to determine whether and when a human operator is to control such operations.

The computer 102 may include or be communicatively coupled to, e.g., via a vehicle 100 network such as a communications bus as described further below, more than one processor, e.g., included in components such as sensors 106, electronic controller units (ECUs) or the like included in the vehicle 100 for monitoring and/or controlling various vehicle 100 components, e.g., a powertrain controller, a brake controller, a steering controller, etc. The computer 102 is generally arranged for communications on a vehicle 100 communication network that can include a bus in the vehicle 100 such as a controller area network (CAN) or the like, and/or other wired and/or wireless mechanisms. Via the vehicle 100 network, the computer 102 may transmit messages to various devices in the vehicle 100 and/or receive messages (e.g., CAN messages) from the various devices, e.g., sensors 106, an actuator 104, a human-machine interface (HMI 108), etc. Alternatively or additionally, in cases where the computer 102 actually comprises a plurality of devices, the vehicle 100 communication network may be used for communications between devices represented as the computer 102 in this disclosure. Further, as mentioned below, various controllers and/or sensors 106 may provide data to the computer 102 via the vehicle 100 communication network.

Via the vehicle 100 network, the computer 102 may transmit messages to various devices in the vehicle 100 and/or receive messages from the various devices, e.g., an actuator 104, a sensor 106, etc. Alternatively or additionally, in cases where the computer 102 comprises multiple devices, the vehicle 100 communication network may be used for communications between devices represented as the computer 102 in this disclosure. As discussed further below, various electronic controllers and/or sensors 106 may provide data to the computer 102 via the vehicle 100 communication network.

The actuators 104 are implemented via circuits, chips, or other electronic and/or mechanical components that can actuate various vehicle 100 subsystems in accordance with appropriate control signals, as is known. The actuators 104 may be used to control vehicle 100 systems such as braking, acceleration, and/or steering of the vehicles.

An inflator actuator 104 is in fluid communication with one or more airbags 110. The inflator expands the airbag 110 with an inflation medium, such as a gas, to move the airbag 110 from the uninflated position to the inflated position. The inflator actuator 104 may be supported by any suitable component. For example, the inflator actuator 104 may be supported by the housing. The inflator actuator 104 may be, for example, a pyrotechnic inflator actuator 104 that ignites a chemical reaction to generate the inflation medium, a stored gas inflator that releases (e.g., by a pyrotechnic valve) stored gas as the inflation medium, or a hybrid. The inflator actuator 104 may be, for example, at least partially in the inflation chamber to deliver inflation medium directly to the inflation chamber or may be connected to the inflation chamber through fill tubes, diffusers, etc. Additionally or alternatively, the inflator actuator 104 may be a pump which can pump in a gas, e.g., air, to the airbag 110 to inflate the airbag 110 or pump out the gas from the airbag 110 to deflate the airbag 110.

A sensor 106 is a device that can obtain one or more measurements of one or more physical phenomena. Often, but not necessarily, a sensor 106 includes a digital-to-analog converter to converted sensed analog data to a digital signal that can be provided to a digital computer 102, e.g., via a network. Sensors 106 can include a variety of devices, and can be disposed to sense and environment, provide data about a machine, etc., in a variety of ways. For example, a sensor 106 could be mounted to a stationary infrastructure element on, over, or near a road. Moreover, various controllers in a vehicle 100 may operate as sensors 106 to provide data via the vehicle 100 network or bus, e.g., data relating to vehicle 100 speed, acceleration, location, subsystem and/or component status, etc. Further, other sensors 106, in or on a vehicle 100, stationary infrastructure element, etc., infrastructure could include cameras, short range radar, long range radar, LIDAR, and/or ultrasonic transducers, weight sensors 106, accelerometers, motion detectors, etc., i.e., sensors 106 to provide a variety of data. To provide just a few non-limiting examples, sensor 106 data could be obtained from active or passive sensing and could include data for determining a position of a component, a location of an object 118, a speed of an object 118, a type of an object 118, a slope of a roadway, a temperature, a presence or an amount of moisture, a fuel level, a data rate, etc.

A lidar sensor 106 (or LIDAR, i.e., Light Detection and Ranging) is another example of an object-detection sensor 106 which uses laser light transmissions to obtain reflected light pulses from objects 118. The reflected light pulses can be measured to determine object 118 distances. Data from a lidar can be provided to generate a three-dimension representation of detected objects 118, sometimes referred to as a point cloud.

The vehicle 100 may be an autonomous vehicle 100. A computer 102 can be programmed to operate the vehicle 100 independently of the intervention of a human driver, completely or to a lesser degree. The computer 102 may be programmed to operate the propulsion, brake system, steering, and/or other vehicle 100 systems based at least in part on data received from the sensor 106. For the purposes of this disclosure, autonomous operation means the computer 102 controls the propulsion device, brake system, and steering system without input from a human driver; semi-autonomous operation means the computer 102 controls one or two of the propulsion system, brake system, and steering system and a human driver controls the remainder; and non-autonomous operation means a human driver controls the propulsion system, brake system, and steering system. The Society of Automotive Engineers (SAE) has defined multiple levels of autonomous vehicle 100 operation. At levels 0-2, a human driver monitors or controls the majority of the driving tasks, often with no help from the vehicle 100. For example, at level 0 ("no automation"), a human driver is responsible for all vehicle 100 operations. At level 1 ("driver assistance"), the vehicle 100 sometimes assists with steering, acceleration, or braking, but the driver is still responsible for the vast majority of the vehicle 100 control. At level 2 ("partial automation"), the vehicle 100 can control steering, acceleration, and braking under certain circumstances without human interaction. At levels 3-5, the vehicle 100 assumes more driving-related tasks. At level 3 ("conditional automation"), the vehicle 100 can handle steering, acceleration, and braking under certain circumstances, as well as monitoring of the driving environment. Level 3 requires the driver to intervene occasionally, however. At level 4 ("high automation"), the vehicle 100 can handle the same tasks as at level 3 but without relying on the driver to intervene in certain driving modes. At level 5 ("full automation"), the vehicle 100 can handle almost all tasks without any driver intervention. Vehicles, such as autonomous or semi-autonomous vehicles, typically include a variety of sensors 106. Some sensors 106 detect internal states of the vehicle 100, for example, wheel speed, wheel orientation, and engine and transmission variables. Some sensors 106 detect the position or orientation of the vehicle 100, for example, global positioning system (GPS) sensors 106; accelerometers such as piezo-electric or microelectromechanical systems (MEMS); gyroscopes such as rate, ring laser, or fiber-optic gyroscopes; inertial measurements units (IMU); and magnetometers. Some sensors 106 detect the external world, for example, radar sensors 106, scanning laser range finders, light detection and ranging (LIDAR) devices, and image processing sensors 106 such as cameras. A LIDAR device detects distances to objects 118 by emitting laser pulses and measuring the time of flight for the pulse to travel to the object 118 and back. Some sensors 106 are communications devices, for example, vehicle 100-to-infrastructure (V2I) or vehicle 100-to-vehicle 100 (V2V) devices. Sensor 106 operation can be affected by obstructions, e.g., dust, snow, insects, etc.

Vehicle 100 sensors 106 may include a variety of devices such as are known to provide data to the vehicle 100 computer 102. For example, the vehicle 100 sensors 106 may include Light Detection And Ranging (LIDAR) vehicle 100 sensor(s), etc., disposed on a top of the vehicle 100, behind a vehicle 100 front windshield 116, around the vehicle 100, etc., that provide relative locations, sizes, and shapes of objects 118 surrounding the vehicle 100. As another example, one or more radar vehicle 100 sensors 106 fixed to vehicle 100 bumpers 112 may provide data to provide locations of the objects 118, second vehicles, etc., relative to the location of the vehicle 100. The vehicle 100 sensors 106 may further alternatively or additionally, for example, include camera vehicle 100 sensor(s), e.g. front view, side view, etc., providing images from an area surrounding the vehicle 100. In the context of this disclosure, an object 118 is a physical, i.e., material, item that can be represented by physical phenomena (e.g., light or other electromagnetic waves, or sound, etc.) detectable by vehicle 100 sensors 106. Thus, vehicles, as well as other items including as discussed below, fall within the definition of "object 118" herein.

A radar sensor 106 as is known uses radio waves to determine the relative location, angle, and/or velocity of an object 118. A radar sensor 106 may provide object 118 detection, i.e., data including dimensions and/or relative location of objects 118 outside the vehicle 100 within a field of view of the radar sensor(s). The field of view is an area in which the radar sensor 106 can detect objects 118. The radar sensors 106 transmit radio magnetic beams, receive reflections of the transmitted beams, and measure a distance to an object 118 reflecting the beams based at least on a time to travel, i.e., a time interval between transmission of a beam and receiving a reflection, i.e., an echo, of the same beam by the radar sensor 106. Additionally or alternatively, a frequency-modulated continuous-wave (FMCW) radar sensor 106 may transmit electromagnetic signals with a frequency continuously varying up and down over a fixed period of time by a modulating signal. Frequency differences between the received signal and the transmit signal correlate with velocity difference between the radar sensor 106 and an object 118 detected and the time delay between the transmitted and received radar signal correspond to the time of flight of the radar waves. Thus, the computer 102 may determine a distance to and velocity of an object 118 based on the determined frequency difference.

A radar sensor 106 may include one or more antennas, and electronic components such as chips, analog to digital converter, digital to analog converter, radio magnetic amplifier, etc. The radar sensor 106 may include an array of antennas oriented in various respective directions. The computer 102 may be programmed to receive reflections of radio magnetic beams transmitted by an antenna of a radar sensor 106 mounted to a vehicle body 114. The computer 102 can be programmed to detect objects 118 based on received reflections of the transmitted beams.

The vehicle 100 can include an HMI 108 (human-machine interface), e.g., one or more of a display, a touchscreen display, a microphone, a speaker, etc. The user can provide input to devices such as the computer 102 via the HMI 108. The HMI 108 can communicate with the computer 102 via the vehicle 100 network, e.g., the HMI 108 can send a message including the user input provided via a touchscreen, microphone, a camera that captures a gesture, etc., to the computer 102, and/or can display output, e.g., via a screen, speaker, etc. The computer 102 may be programmed to output data to the HMI 108 indicating that radar sensor 106 operation is impaired due to deployment of an exterior airbag 110. Additionally or alternatively, as discussed below, the computer 102 may be programmed to output data including a reduced vehicle 100 speed limit due to blockage of radar sensor 106. The computer 102 may be programmed to output data to the HMI 108 indicating that the radar sensor 106 calibration parameters are adjusted to compensate for blockage of the radar sensor 106 due to an inflated airbag 110 in the field of view of the radar sensor.

A vehicle 100 airbag 110 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

An exterior airbag 110 is deployed from an uninflated state, e.g., between the bumper 112 and body (FIG. 1), and/or within the body such as below the hood, to a position in the exterior of the vehicle 100. The airbag 110 in the uninflated state may be placed behind and/or adjacent an exterior surface of the vehicle 100. "Adjacent," herein, means touching either an interior or an exterior surface of the body. For example, as shown in FIG. 1, a ladder-shape airbag 110 placed behind the bumper 112 in the uninflated state, may inflate, upon deployment, in front of the vehicle 100 front bumper 112. Upon filling an airbag 110 with a specified amount of gas reaching a specified gas pressure inside the airbag 110, the airbag 110 is at a "fully" inflated state (or position). An exterior airbag 110 may have various shapes and dimensions in the inflated state. Additionally or alternatively, an airbag 110 may be inflated to a partially inflated state (or position). In a partially inflated state, a shape and volume of the airbag 110 may differ from the fully inflated state, e.g., 50% of an inflation compared to fully inflated state. Additionally or alternatively, changes of shape of an airbag 110 with respect to the volume of the airbag 110 may be based on a non-linear model. Additionally or alternatively, in the inflated state, an external airbag 110 may be placed on the vehicle 100 hood, windshield 116, etc. Table 1 shows an example of multiple inflation states specified based on a gas pressure inside the airbag 110. Additionally or alternatively, inflation states may be specified based on a volume of gas pumped in the airbag 110 and/or volume of the inflated airbag 110, etc.

TABLE 1

| Inflation State | Volume filled (% of nominal maximum) | Pressure (% of nominal maximum) |
| --- | --- | --- |
| Fully inflated | 100% | 90% |
| 50% Partially inflated | 50% | 70% |
| 30% Partially inflated | 30% | 50% |
| Uninflated | 0 | 0 |
| Deflated | 20% | 25% |

The vehicle 100 typically includes a body. The vehicle body 114 includes body panels partially defining an exterior of the vehicle 100. The body panels may present a class-A surface, e.g., a finished surface exposed to view by a customer and free of unaesthetic blemishes and defects. The body panels include, e.g., a roof, hood, bumper 112, etc.

The vehicle 100 may include a windshield 116 disposed at the front end of a passenger cabin and extending above the instrument panel. The windshield 116 may extend from one side of the vehicle 100 to the other side of the vehicle 100. The windshield 116 may extend from the roof to the instrument panel. The windshield 116 may face in a forward direction from the passenger cabin. The windshield 116 may be any suitably transparent material, including glass such as laminated, tempered glass, or plastic.

A road herein, unless specified otherwise, means any ground surface designated for travel of a vehicle 100. Typically, a road includes a prepared travel surface, e.g., graded dirt, asphalt, gravel, etc. Further, a road typically includes markings, e.g., paint, embedded markers, etc. to guide vehicle 100 travel, e.g., in one or more lanes. A road can include more than one lane for vehicle 100 travel; each lane can be designated for travel in a specified direction. In some examples, a first road can cross or merge with a second road, thereby forming an intersection.

The computer 102 may be programmed to deploy an exterior airbag 110, e.g., a front exterior airbag 110, by actuating an inflator actuator 104 fluidly communicating with the respective airbag 110, upon determining (or predicting) an imminent impact. The computer 102 may determine that an impact is imminent based on data received from vehicle 100 sensors 106, e.g., radar sensor 106, camera sensor 106, lidar sensor 106, etc. For example, the computer 102 may be programmed to determine that an impact with an object 118 on a road is imminent upon determining based on a location of the object 118 and a vehicle 100 speed that a time-to-collision (TTC) is less than a threshold, e.g., 1000 milliseconds (ms). TTC can refer to a time remaining before a rear-end accident if a vehicle 100 path and a vehicle 100 speed are maintained. The computer 102 may be programmed, using conventional techniques, to determine a TTC to an object 118 based on a vehicle 100 path, a vehicle 100 speed, a vehicle 100 acceleration, a distance d to the object 118, an object 118 speed, and the object 118 path. A path is specified by multiple waypoints on the ground surface, e.g., on a road surface. Additionally or alternatively, the computer 102 may actuate an external airbag 110, based on data received from a body pressure sensor 106, upon determining that a pressure applied to the vehicle body 114 exceeds a threshold, e.g., 224 N while the vehicle 100 velocity exceeds 5 kph. The body pressure sensor 106 may be mounted to the vehicle body 114, e.g., behind a front bumper 112. A body pressure sensor 106 measures pressure applied to the vehicle body 114, e.g., due to an impact with an object 118.

The computer 102 can be programmed to determine that an exterior airbag 110 has been deployed upon detecting an actuation of an inflator actuator 104 to deploy an exterior airbag 110, e.g., an airbag controller or the like can deploy the airbag 110 upon detecting a TTC less than a specified threshold based on the vehicle 100 sensor 106 data. The computer 102 can be programmed to determine an airbag 110 inflation state based on the vehicle 100 sensor 106 data. The computer 102 can be programmed to adjust a calibration parameter of a vehicle 100 radar sensor 106 based on the determined airbag 110 inflation state. The computer 102 can then operate the vehicle 100 radar sensor 106 based on the adjusted calibration parameter. The computer 102 can be programmed to update output characteristics of the radar sensor 106 for operating the vehicle 100 based on the determined airbag 110 inflation state.

With reference to exemplary Table 1, the computer 102 may be programmed to determine the airbag 110 inflation state based on an amount of inflation of the airbag 110, e.g., an amount of inflation of 30% may correspond to "30% partially inflated state." For example, the computer 102 may determine the amount of inflation of the airbag 110 based on the vehicle 100 sensor 106 data. The computer 102 may be programmed to determine an amount of inflation, e.g., in cubic meter (m³), based on an amount of gas pumped to the exterior airbag 110. The vehicle 100 may include a gas flow sensor 106 measuring a flow of gas between the inflator actuator 104 and the airbag 110. The computer 102 may be programmed to determine the amount of gas pumped to the exterior airbag 110 based on the data received from the gas flow sensor 106 and a duration of pumping (e.g., a time since actuation of inflator actuator 104).

Figure 2A:
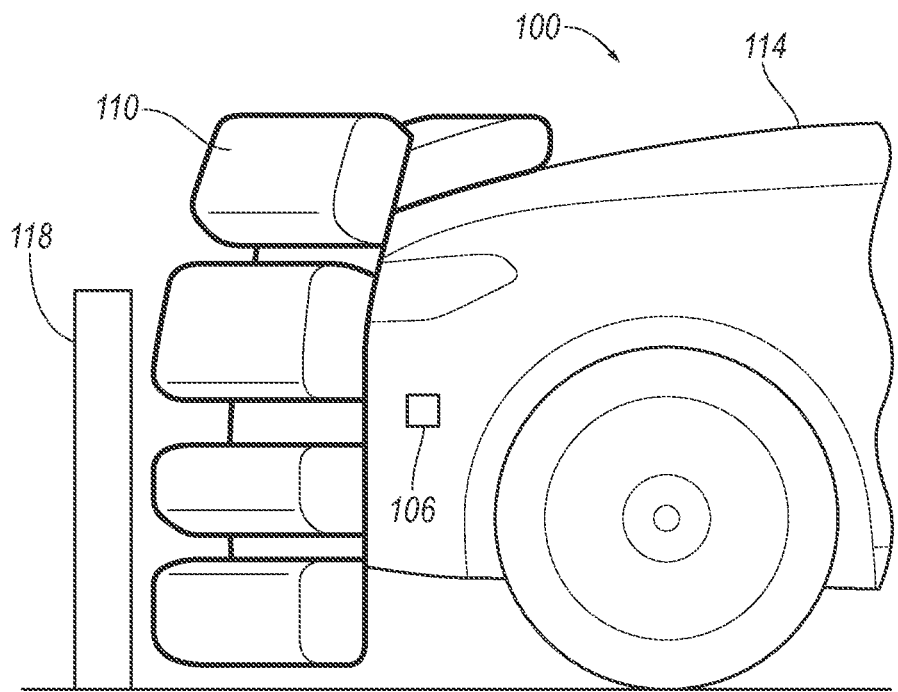
FIG. 2A shows a perspective side view of the vehicle of FIG. 1 and the external airbag in the inflated state.
Figure 2B:
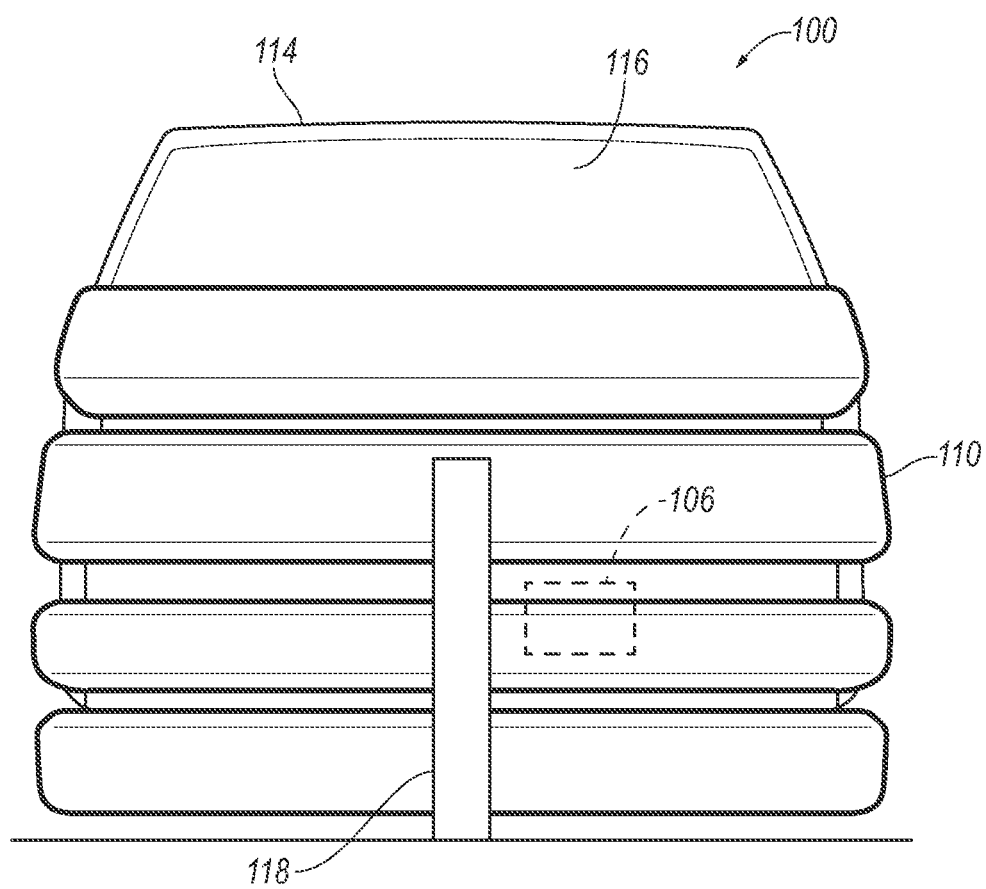
FIG. 2B shows a perspective front view of the vehicle and the external airbag in the inflated state.

The computer 102 may be programmed to determine an amount of gas pumped to the airbag 110 based on data received from a gas flow sensor 106 measuring a rate, e.g., specified in cubic meters per second (m³/s), of gas flowing into or out of the airbag 110. The computer 102 110 may be programmed to determine an amount of gas pumped into the airbag 110 based on a duration of pumping gas into the airbag 110, e.g., 250 ms, and a rate of flowing to the airbag 110, e.g., 0.1 m³/s. The computer 102 may store in a memory a maximum volume of an airbag 110, e.g., 0.5 m³. The computer 102 may determine, based on example Table 1 and a maximum volume of the airbag 110 also stored in the memory, that, after, e.g., 250 ms, from initiation of a deployment of the airbag 110, an amount of gas pumped into the airbag 110 exceeds a volume threshold corresponding to 30% partially inflated state. Thus, the computer 102 may determine an inflation state to be "partially inflated to 30%." The computer 102 may be programmed to repetitively measure an amount of gas pumped into the airbag 110 and update the airbag 110 inflation state. For example, the computer 102 may determine 1 second after initiation of the deployment, based on the amount of gas pumped into the airbag 110, that the airbag 110 inflation state is fully inflated (FIGS. 2A-2B).

Additionally or alternatively, the computer 102 may be programmed to determine the airbag 110 inflation state based on a detected shape of the airbag 110 after an actuator 104 has commenced inflation of the airbag 110. The computer 102 may be programmed to determine the shape of the airbag 110 based on data received from, e.g., an object 118-detection sensor 106 such as a camera sensor 106, a lidar sensor 106, ultrasound sensor 106, etc. FIGS. 2A-2B show an exterior airbag 110 in the fully inflated position. The computer 102 may detect a top of the ladder-shaped airbag 110 shown in FIGS. 2A, 2B by using conventional image analysis techniques to interpret data received from a camera sensor 106 mounted to the vehicle 100 windshield 116. The computer 102 may further determine, by comparing data stored in a computer 102 memory to image data received from the camera sensor 106, that the airbag 110 state is fully inflated. The computer 102 may store data including dimensions, e.g., a height of a top of the airbag 110 in the fully inflated state from the ground. The computer 102 may determine, based on the camera data, a location of the top of the inflated airbag 110 from the ground surface, thereby determining that the airbag 110 has reached a fully inflated state. Additionally or alternatively, the computer 102 may be programmed to detect a shape of the inflated airbag 110 based on the received data from a vehicle 100 object 118 detection sensor 106 and estimate the dimensions of the airbag 110 using conventional image processing techniques. The computer 102 may then estimate a volume of the airbag 110 (i.e., a volume of gas in the airbag 110) based on the estimated dimensions of the inflated airbag 110. The computer 102 may then determine the inflation state of the airbag 110 based on the estimated volume of the gas, e.g., using exemplary Table 1 data.

In another example, the computer 102 may determine a shape of the inflated object 118 and estimate the inflation state based on stored data in the computer 102 memory. The computer 102 may store image data including a shape of the airbag 110 in different inflation states, e.g., a first image for the 30% inflation state, a second image for the 50% inflation state, and a third image for the fully inflated state. The computer 102 may determine the inflation state of the airbag 110 based on the stored image data and the received sensor 106 data, e.g., by identifying a store image most similar to the received image of the airbag 110.

Besides airbag 110 shape, gas pressure, and the amount of gas filled in the airbag 110, other physical conditions such as wind or air movement, e.g., caused by vehicle 100 speed, may change a shape of the exterior airbag 110. Thus, the computer 102 may determine a shape of the airbag 110 based on a vehicle 100 speed and/or weather data (specifying speed and direction of wind). The computer 102 may store data specifying a shape of the inflated airbag 110 at multiple vehicle 100 speeds, e.g., 10, 20, . . . , 100 kilometers per hour (kph). Thus, the computer 102 may be programmed to estimate the shape of the inflated airbag 110 based on the vehicle 100 speed. In one example, the computer 102 may estimate the shape of the inflated airbag 110 based on the stored data and the vehicle 100 speed, e.g., by interpolating between stored shapes of nearest stored speed values to the vehicle 100 speed.

A calibration parameter of a radar sensor 106, in the present context, is (i) one or more intrinsic calibration parameters, and/or (ii) one or more extrinsic calibration parameters. Intrinsic calibration parameters are parameters, i.e., measurements of physical values, i.e., that describe physical characteristics of a sensor 106, e.g., operation frequency, signal power level, and/or a relationship between received signal characteristics, e.g., gain, frequency, etc., and a distance d to an object 118. A coordinate system may be a 2D (two-dimensional) or 3D (three-dimensional) Cartesian coordinate system with an origin point inside or outside the vehicle 100. Intrinsic calibration parameters are applicable regardless of where a radar sensor 106 is located in or on a vehicle 100. Extrinsic calibration parameters, in contrast, are values that are specific to (i) a location of the radar sensor 106 relative to the coordinate system, (ii) a pose (roll, pitch, and yaw) of the radar sensor 106 relative to the coordinate system, (iii) material, dimension, etc., of the bumper 112 or any body material covering the radar sensor 106, etc. Various conventional techniques may be used to determine extrinsic calibration values, e.g., placing objects 118 in a lab within the field of view of the radar sensor 106 mounted to the vehicle 100 and determining a roll, pitch, and yaw of the sensor 106 based on the received reflections from the objects 118.

Deployment of an airbag 110 within a field of view a vehicle 100 radar sensor 106, e.g., as shown in FIG. 2A, blocks some or all of the field of view of the radar sensor 106, thereby resulting in a change of default base reflection pattern received by the radar sensor 106. The default base reflection pattern of a radar sensor 106 may include data specifying characteristics, e.g., time to travel, signal amplitude, frequency, etc., of reflections expected to be received from body parts such as the bumper 112. A partially or fully inflated airbag 110 in the field of view of the radar sensor 106 typically results in a change of the base reflection pattern. Additionally or alternatively, a field of view of a radar may shrink (i.e., become narrower) when a partially or fully inflated airbag 110 is in the field of view of the airbag 110.

A radar sensor 106 operates based on received reflections from objects 118, e.g., a second vehicle 100, a building, etc.

A bumper 112 and/or other vehicle body 114 parts covering the radar sensor 106 may be formed of materials which are substantially transparent (e.g., 90% or more of signals pass through the bumper 112 and/or other vehicle body 114 parts while 10% or less is reflected) to radar electromagnetic signals. However, the radar sensor 106 antenna may receive reflections from the bumper 112 or other body parts; a portion of radar waves may be reflected or absorbed by the material as it is transmitted or received, and/or another portion of waves may be deflected from a nominal direction of waves. Such reflections, herein referred to as "default base reflections," are expected to be received permanently from the radar sensor 106 and not to indicate a presence of an object 118 exterior of the vehicle 100. Additionally, a presence of the bumper 112 or other body parts may affect the reflections received from objects 118, e.g., a second vehicle 100, exterior of the vehicle 100. The computer 102 may be programmed to store calibration data for radar sensor 106 operation. Although airbag 110 may be formed of material substantially transparent to the radar electro-magnetic signals, nevertheless, partial reflection and/or deflection of the radar electro-magnetic signals by the material of the inflated airbag 110 in the field of view of the radar sensor 106 may result in a change of the base reflection.

The computer 102 may be programmed to determine one or more adjusted calibration parameters such that a blockage of a field of view of the radar sensor 106 by the airbag 110 is at least in part compensated for a presence of the inflated airbag 110. In one example, the computer 102 may be programmed to adjust a calibration parameter by selecting one calibration value from a set of stored calibration values based on the determined airbag 110 inflation state. The computer 102 may be programmed to determine the set of stored calibration values by determining a base reflection of the radar sensor 106 based on the airbag 110 inflation state. Table 2 shows an example set of (i) calibration values and (ii) output characteristics (as discussed below), along with the airbag 110 inflation state selected when these respective values and output characteristics data are identified. Output characteristics are metadata describing a current output of data from a sensor, such as, a detection range (i.e., range at which the sensor can detect phenomena), a sensor accuracy indicated for example by a rate of missed detection of objects 118 or a current error in detected phenomena, such as a distance to a detected object, a relative speed of a detected object, etc. A detection range of radar sensor 106 is a maximum distance from the sensor 106 within which the radar sensor 106 can detect objects 118. A rate of misdetection is a ratio, e.g., specified in a percentage, of misdetection of an object 118 compared to correctly detecting the object 118. An error in determining the distance d to an object 118 may be specified in a percentage, e.g., 10%, or a distance, e.g., 5 m. For example, based on a 10% error, a real distance to an object 118 is between 90 and 110 m upon determining a distance of 100 m to the object 118. Each of n calibration sets may include one or more calibration parameters of the radar sensor 106 corresponding to each of the inflation states. A default base calibration may be used when the airbag 110 is in the uninflated state.

TABLE 2

| Inflation state | Calibration data | Output characteristics |
| --- | --- | --- |
| Uninflated | Default base calibration | Default output characteristics data |
| 10% partially inflated | Calibration set 1 | Output characteristics data set 1 |

TABLE 2-continued

| Inflation state | Calibration data | Output characteristics |
| --- | --- | --- |
| 20% partially inflated | Calibration set 2 | Output characteristics data set 2 |
| 30% partially inflated | Calibration set 3 | Output characteristics data set 3 |
| ... | ... | ... |
| Fully inflated | Calibration set n | Output characteristics data set n |

The computer 102 may be programmed to determine an inflation state not included in the stored set of inflations states, e.g., 14% partially inflated. The computer 102 may be programmed to adjust the calibration parameter by interpolating the set of stored values based on the determined inflation state and inflation state of each respective stored value upon determining that the stored values lack a stored value corresponding to the determined airbag 110 inflation state. For example, the computer 102 may interpolate the calibration values corresponding to the inflation states 10% and 20% partially inflated to determine the calibration values for the determined inflation state of 14% partially inflated.

Although adjusting calibration parameter(s) of the radar sensor 106, upon deployment of an external airbag 110 blocking the radar sensor 106 field of view, results in improved operation of the radar sensor 106 compared to using the default base calibration, still output characteristic(s) of the radar sensor 106 may change compared to the output characteristics of an unblocked radar sensor 106. For example, as a result of a blockage due to an inflated airbag 110 in the field of view of the radar sensor 106, a detection range of the radar sensor 106 may be reduced, an error in the determined distance to an object 118 may be increased, and/or a rate of misdetection of objects 118 may increase.

The computer 102 may store default output characteristics data set specifying, e.g., an error in determining distance, misdetection rate, etc., for operation of the radar sensor 106 when the airbag 110 is in the uninflated state. The computer 102 may be programmed to update the radar sensor 106 error based on the determined inflation state of the airbag 110. With respect to exemplary data of Table 2, the computer 102 may store output characteristics of the radar sensor 106 for different inflation states. The output characteristics data for various inflation states may be determined using empirical methods, e.g., operating the radar sensor 106 for each of the airbag 110 inflation state and comparing the radar sensor 106 data with ground truth data, e.g., a lidar sensor 106.

The vehicle 100 may operate while the airbag 110 is in a partially or fully inflated state. The computer 102 may be programmed to operate the vehicle 100 based on data received from the vehicle 100 radar sensor 106 (operating based on the one or more calibration parameters) and the updated output characteristics of the radar sensor 106. For example, an updated detection range of the radar sensor 106 may be reduced. Thus, the computer 102 may be programmed to operate the vehicle 100 with a maximum speed less than default speed determined based on the location of the vehicle 100. In one example, when detection range is reduced from 100 m to 80 m, the computer 102 may reduce the vehicle 100 speed by 20%. In one example, the computer 102 may store data, e.g., in form of a table specifying adjusted vehicle 100 speed limit based on the updated output characteristics, and to determine the adjusted speed limit based on the updated output characteristics data and the stored data.

Figure 3:
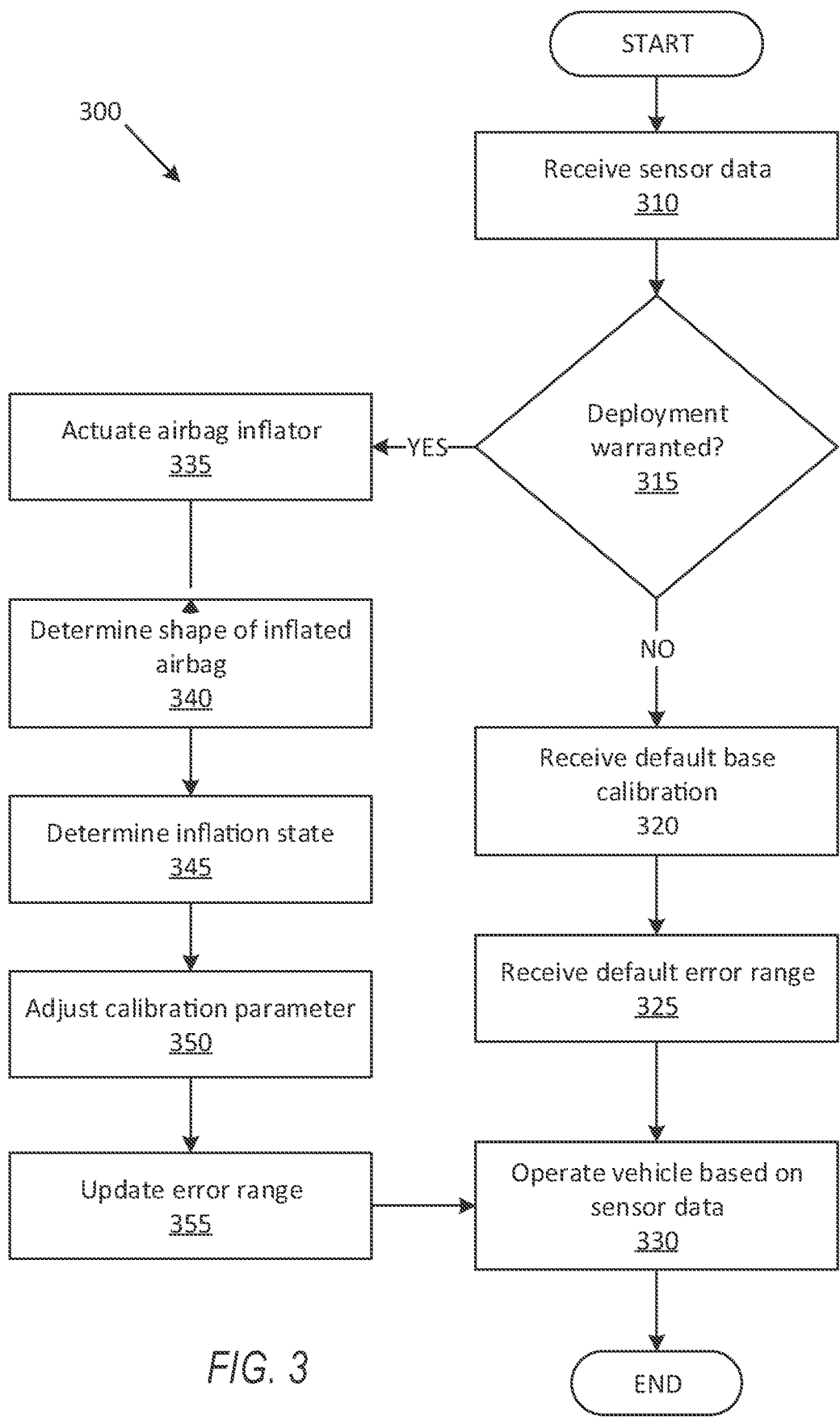
FIG. 3 is a flowchart of an exemplary process for operating the vehicle.

FIG. 3 is a flowchart of an exemplary process 300 for operating the vehicle 100. A vehicle 100 computer 102 may be programmed to execute blocks of the process 300. Additionally or alternatively, the blocks of the process 300 may be executed by a combination of multiple computers, e.g., an airbag ECU, e.g., airbag electronic control unit (ECU) may execute some of the blocks, whereas the computer 102 could execute other blocks of the process 300. For example, an airbag ECU may be programmed to receive sensor 106 data, to determine whether a deployment of an airbag is warranted, upon determining whether a deployment of an airbag 110 is warranted, to actuate the inflator actuator 104, and to send data, e.g., CAN messages, via a vehicle communication bus including data indicating that an inflation of the airbag 110 is initiated. The computer 102 may be then programmed to receive data from the airbag ECU and data from the sensors 106, and operate the vehicle 100.

The process 300 begins in a block 310, in which the computer 102 receives sensor 106 data. The computer 102 may be programmed to receive data from the vehicle 100 sensors 106, e.g., one or more radar sensors 106, gas pressure sensor 106, body pressure sensor 106, gas flow sensor 106, speed sensor 106, camera sensor 106, lidar sensor 106, etc.

Next, in a decision block 315, the airbag ECU, or possibly the computer 102, determines whether a deployment of an exterior airbag 110 is warranted. Determining that an airbag 110 deployment is warranted can be based on, e.g., a TTC to an object 118 in the vehicle 100 path, an amount of pressure measured by a vehicle body pressure sensor 106. For example, the computer 102 may determine that a deployment of a front exterior airbag 110 is warranted upon determining that a TTC to the object 118 is less than a threshold, e.g., 1000 ms. If the airbag ECU or possibly the computer 102 determines that the deployment of the exterior airbag 110 is warranted, then the process 300 proceeds to a block 335; otherwise the process 300 proceeds to a block 320.

In the block 320, the computer 102 receives default base calibration data for the radar sensor 106, e.g., from a computer 102 memory and/or a remote computer 102.

Following the block 320, in a block 325, the computer 102 receives default output characteristics data, e.g., from a computer 102 memory and/or a remote computer 102.

In the block 330, which can be reached from the block 325 or a block 355, the computer 102 operates the vehicle 100 based on the received sensor 106 data. For example, if the block 330 is reached from the block 355, the computer 102 may operate the radar sensor 106 based on the adjusted calibration parameter and actuate a vehicle 100 actuator 104, e.g., propulsion, based on the received sensor 106 data and the updated output characteristics, e.g., by reducing a vehicle 100 speed limit, as discussed above. In another, if the block 330 is reached from the block 325, the computer 102 may be programmed to operate the radar sensor 106 based on the stored default calibration parameters and actuate a vehicle 100 actuator 104, e.g., propulsion, based on the default output characteristics and received sensor 106 data. Following the block 330, the process 300 ends, or alternatively, returns to the block 310, although not shown in FIG. 3.

In the block 335, an airbag ECU or the computer 102 actuates an airbag 110 inflator fluidly communicating with the airbag 110 to inflate the airbag 110 (i.e., pumping a gas into the airbag 110). In one example, the actuator 104 is a pump and the computer 102 actuates the pump actuator 104 to pump a gas in the airbag 110 to inflate the airbag 110.

In the block 340, the computer 102 determines a shape of the inflated airbag 110. For example, the computer 102 may be programmed to determine the shape of the airbag 110 based on data received from an object 118-detection sensor 106, e.g., camera sensor 106, lidar sensor 106, etc.

Next, in a block 345, the computer 102 determines an inflation state of the airbag 110. The computer 102 may be programmed, e.g., in accordance with example Table 1, to determine the inflation state of the airbag 110 based on sensor 106 data including a flow rate of gas flowing into the airbag 110, a pressure of the gas inside the airbag 110, the determined shape of the airbag 110, etc.

Next, in a block 350, the computer 102 adjusts one or more calibration values of the radar sensor 106 based on the determined inflation state of the airbag 110. The computer 102 may be programmed, in accordance with example Table 2, to determine the adjusted calibration parameters for the radar sensor 106 based on the determined inflation state.

Next, in a block 355, the computer 102 updates output characteristics of the radar sensor 106. In one example, the computer 102 may be programmed, in accordance with Table 2, to determine the updated output characteristics based on the determined inflation state. As discussed above, following the block 355, in the block 330, the computer 102 operates the vehicle 100 based on the received sensor 106 data, the updated output characteristics.

Use of "in response to," "based on," and "upon determining" herein indicates a causal relationship, not merely a temporal relationship.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, Python, Intercal, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A computer, comprising a processor and a memory, the memory storing instructions executable by the processor to:
   upon detecting an airbag deployment in a vehicle, determine an airbag inflation state based on vehicle sensor data;
   adjust a calibration parameter of a vehicle radar sensor based on the determined airbag inflation state;
   operate the vehicle radar sensor based on the adjusted calibration parameter; and
   update an output characteristic of the radar sensor for operating the vehicle based on the determined airbag inflation state.

2. The computer of claim 1, wherein the instructions further include instructions to determine the airbag inflation state based on at least one of a shape of the airbag, or an amount of inflation of the airbag.

3. The computer of claim 2, wherein the instructions further include instructions to determine the amount of inflation of the airbag based on the vehicle sensor data including at least one of an amount of gas pumped to the airbag, or a pressure of gas inside the airbag.

4. The computer of claim 3, wherein the instructions further include instructions to determine the amount of gas pumped to the airbag based on data received from a gas flow sensor measuring a rate of gas flowing into or out of the airbag.

5. The computer of claim 2, wherein the instructions further include instructions to:
   determine the shape of the airbag in the inflation state based on (i) object detection data received from a second object-detection sensor including an ultrasound sensor, a lidar, or a camera sensor, (ii) a wind speed, (iii) a vehicle speed; and
   determine the airbag inflation state based on the determined shape of the airbag.

6. The computer of claim 1, wherein the instructions further include instructions to determine the adjusted calibration parameter such that a blockage of a field of view of the radar sensor by the airbag is at least in part compensated for a presence of the airbag.

7. The computer of claim 1, wherein the instructions further include instructions to adjust the calibration parameter by selecting one calibration value from a set of stored calibration values based on the determined airbag inflation state.

8. The computer of claim 7, wherein the instructions further include instructions to determine the set of stored calibration values by determining a base reflection of the vehicle radar sensor for the airbag inflation state.

9. The computer of claim 7, wherein the instructions further include instructions to adjust the calibration parameter by interpolating the set of stored values based on the determined airbag inflation state and inflation state of each respective stored value upon determining that the stored values lack a stored value corresponding to the determined airbag inflation state.

10. The computer of claim 1, wherein the updated output characteristic specifies a change in at least one of a radar sensor detection range, a misdetection rate of the vehicle radar sensor, or an object distance detection error of the vehicle radar sensor.

11. The computer of claim 1, wherein the instructions further include instructions to cause the airbag deployment based on the vehicle sensor data including at least one of a time-to-collision with an obstacle and a pressure applied to a vehicle body.

12. The computer of claim 1, wherein the airbag is adjacent a vehicle front bumper, a front windshield, or a side of the vehicle.

13. The computer of claim 1, wherein the airbag inflation state is one of an uninflated position, deflated position, a partially inflated position, and a fully inflated position.

14. The computer of claim 1, wherein the instructions further include instructions to operate the vehicle based on data received from the vehicle radar sensor and the updated output characteristic of the radar sensor.

15. A method, comprising:
   upon detecting an airbag deployment in a vehicle, determining an airbag inflation state based on vehicle sensor data;
   adjusting a calibration parameter of a vehicle radar sensor based on the determined airbag inflation state;
   operating the vehicle radar sensor based on the adjusted calibration parameter; and
   updating an output characteristic of the radar sensor for operating the vehicle based on the determined airbag inflation state.

16. The method of claim 15, further comprising determining the airbag inflation state based on at least one of a shape of the airbag, or an amount of inflation of the airbag.

17. The method of claim 16, further comprising determining the amount of inflation of the airbag based on the vehicle sensor data including at least one of an amount of gas pumped to the airbag, or a pressure of gas inside the airbag.

18. The method of claim 16, further comprising:
   determining the shape of the airbag in the inflation state based on (i) object detection data received from a second object-detection sensor including an ultrasound sensor, a lidar, or a camera sensor, (ii) a wind speed, (iii) a vehicle speed; and
   determining the airbag inflation state based on the determined shape of the airbag.

19. The method of claim 15, further comprising determining the adjusted calibration parameter such that a blockage of a field of view of the radar sensor by the airbag is at least in part compensated for a presence of the airbag.

20. The method of claim 15, further comprising adjusting the calibration parameter by selecting one calibration value from a set of stored calibration values based on the determined airbag inflation state.

* * * * *